(12) United States Patent
Stancu et al.

(10) Patent No.: US 6,924,993 B2
(45) Date of Patent: Aug. 2, 2005

(54) METHOD AND APPARATUS FOR CONTROLLING A STAND-ALONE 4-LEG VOLTAGE SOURCE INVERTER

(75) Inventors: Constantin C. Stancu, Anaheim, CA (US); Silva Hiti, Redondo Beach, CA (US)

(73) Assignee: General Motors Corporation, Detroit, MI (US)

(*) Notice: Subject to any disclaimer, the term of this patent is extended or adjusted under 35 U.S.C. 154(b) by 133 days.

(21) Appl. No.: 10/669,919

(22) Filed: Sep. 24, 2003

(65) Prior Publication Data

US 2005/0063205 A1 Mar. 24, 2005

(51) Int. Cl.$^7$ .............................................. H02M 1/12
(52) U.S. Cl. ........................ 363/41; 363/56.02; 363/98; 323/908
(58) Field of Search .............................. 363/37, 40, 41, 363/50, 56.02, 56.03, 98, 132, 49; 323/908

(56) References Cited

U.S. PATENT DOCUMENTS 5,654,882 A * 8/1997 Kanazawa et al. ............ 363/37
6,052,297 A * 4/2000 Akamatsu et al. ............ 363/50

2004/0196679 A1 * 10/2004 Apeland et al. ............ 363/132

OTHER PUBLICATIONS

R.A. Gannett, Application of Synchronous and Stationary Frame Controllers for Unbalanced and Non–Linear Load Compensation in 4–Leg Inverters, May 2002.
Michael J. Ryan, Decoupled Control of a Four–Leg Inverter via a New 4x4 Transmission Matrix, IEEE Transactions on Power Electronics, vol. 16, No. 5, Sep. 2001.
Krause et al., Analysis of Electric Machinery, no date.
Richard Zhang, A Three–Phase Inverter with A Neutral Leg with Space Vector Modulation, Feb. 1997, pp. 857–863.

* cited by examiner

Primary Examiner—Jessica Han
(74) Attorney, Agent, or Firm—Christopher DeVries

(57) ABSTRACT

Methods and apparatus are provided for controlling a stand-alone four-leg three-phase inverter. The inverter three-phase output is converted from AC domain elements to corresponding DC domain elements. The DC domain elements are processed into combined regulating and imbalance compensating signals, including over-current limiting. The compensating signals are restored to corresponding AC domain signals, and are processed into control inputs for the inverter, in order to stabilize the inverter output when connected to an unbalanced load. The inverter controller can be implemented entirely in software as a control algorithm.

13 Claims, 3 Drawing Sheets

METHOD AND APPARATUS FOR CONTROLLING A STAND-ALONE 4-LEG VOLTAGE SOURCE INVERTER

TECHNICAL FIELD

The present invention generally relates to three-phase voltage source inverters, and more particularly relates to the control of 4-leg three-phase voltage source inverters.

BACKGROUND

Three-phase voltage source inverters (VSI's) are generally used to convert DC power into three-phase AC power. Typically, the three-phase output voltages are sinusoidal waveforms spaced 120 degrees apart, to be compatible with a wide variety of applications requiring conventional AC power. In general, the output power frequencies commonly used are 50, 60, and 400 hertz, but other frequencies could be used as well. One current example of an inverter application is the electric or hybrid automobile, where a DC power source, such as a battery, fuel cell array, or other equivalent device, is converted into an AC power supply for various internal control functions, including the propulsion system.

The quality of an inverter is generally determined by its output voltage and frequency stability, and by the total harmonic distortion of its output waveforms. In addition, a high quality inverter should maintain its output stability in the presence of load current variations and load imbalances.

In the case of unbalanced loads, the 4-leg three-phase inverter topology is generally considered to offer superior performance than a 3-leg three-phase topology. That is, with an unbalanced load, the three-phase output currents from an inverter will generally not add up to zero, as they would in a 3-leg balanced load situation. Therefore, a fourth (neutral) leg is typically added to accommodate the imbalance in current flow caused by an unbalanced load. If a neutral is not used with an unbalanced load, voltage imbalances may occur at the load terminals, and the output power quality may be adversely affected.

The operational functions of a typical inverter are generally controlled by drive signals from an automatic controller. The controller and inverter are usually implemented as a closed loop control system, with the inverter output being sampled to provide regulating feedback signals to the controller. The feedback signals typically include samples of the output voltage and current signals, and can also include harmonics of the fundamental output frequency.

The ability of an inverter control system to compensate for undesirable harmonics is generally limited by the bandwidth of the system voltage control loop, which may not be adequate for compensating high frequency harmonic distortion. For example, in a typical cascaded voltage/current regulator configuration, the voltage loop bandwidth is generally limited to approximately $\frac{1}{100}^{th}$ of the sampling frequency. Due to technical factors, the sampling frequency is usually limited to a range of 5 to 20 kHz, thus limiting the voltage loop bandwidth to a range of 50 to 200 Hz. Therefore, harmonic compensation and transient response would be limited to frequencies within this range.

Moreover, the transient response characteristics of an inverter control system may also be limited by the overall execution time of the regulating loop software modules. That is, the larger the number of software modules, the greater the execution time, and the slower the transient response.

Accordingly, it is desirable to provide an inverter controller with a relatively high voltage control loop bandwidth, for improved harmonic compensation and transient response. In addition, it is desirable to provide an inverter controller with a minimal quantity of software modules, in order to speed up execution and reduce throughput time. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, methods and devices are provided for controlling a multi-phase stand-alone inverter. One method comprises the following steps:

a) converting the multi-phase inverter output from an AC domain to a DC domain equivalent, where the DC equivalent includes feedback voltage elements and associated feedback current elements, each voltage element and associated current element corresponding to one phase of the multi-phase output;

b) comparing each of the feedback voltage elements to a corresponding reference voltage to create corresponding difference voltage signals;

c) processing the difference voltage signals to create voltage regulating signals, where each of the voltage regulating signals includes a fundamental compensating component combined with an imbalance compensating component;

d) limiting the voltage regulating signals with a current limiting factor derived from the feedback current elements;

e) converting the voltage regulating signals to AC domain equivalents;

f) processing the AC domain equivalents to produce a set of control inputs to the inverter;

g) providing the set of control inputs to the inverter to enable compensating regulation of the fundamental and imbalance characteristics of the multi-phase output of the inverter.

An exemplary embodiment of a device for controlling a multi-phase stand-alone inverter includes:

a converter configured to transform the alternating current multi-phase output to a direct current equivalent, where the direct current equivalent includes feedback voltage elements and associated feedback current elements, each voltage element and its associated current element corresponding to one phase of the multi-phase output;

a set of regulators, each regulator corresponding to a respective feedback voltage element, with each regulator configured to compare its respective feedback voltage element to a corresponding reference voltage to create a difference voltage signal, and to process the difference voltage signal into a voltage regulating signal, including a fundamental compensating component and an imbalance compensating component;

a set of limiters, each limiter corresponding to one of the voltage regulating signals and configured to limit its respective voltage regulating signal with a current limiting factor derived from the feedback current elements;

an inverse converter configured to inverse transform the voltage regulating signals into alternating current equivalents;

an inverter driver configured to process the alternating current equivalents to produce control inputs to the inverter that enable compensating regulation of the fundamental and imbalance characteristics of the multiphase output.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of voltage source inverters operating in a stand-alone mode. Generally, this type of inverter is used to convert DC power available at a selected voltage into AC power with fixed voltage and frequency. Ideally, the output voltage and frequency stability of an inverter should be independent of load variations and imbalances. To provide this type of stabilization, an inverter controller may be used in a closed loop feedback configuration to provide regulating and imbalance compensating signals to the inverter. The inverter controller may be implemented in hardware or software, or any combination of the two.

As previously noted in the Background section, the four-leg inverter topology is generally used for quality AC power generation into a three-phase unbalanced load application. The fourth leg provides a return path for the neutral imbalance current of a three-phase load.

A three-leg inverter configuration typically connects the load neutral to the mid-point of two series-connected capacitors across the DC voltage source. In this configuration, the AC output voltage would be approximately 0.5Vdc, whereas the four-leg configuration provides an AC output voltage of approximately 0.578Vdc. A further advantage of the four-leg configuration is that a smaller, single capacitor can be used instead of the two required for the three-leg approach.

Figure 1:
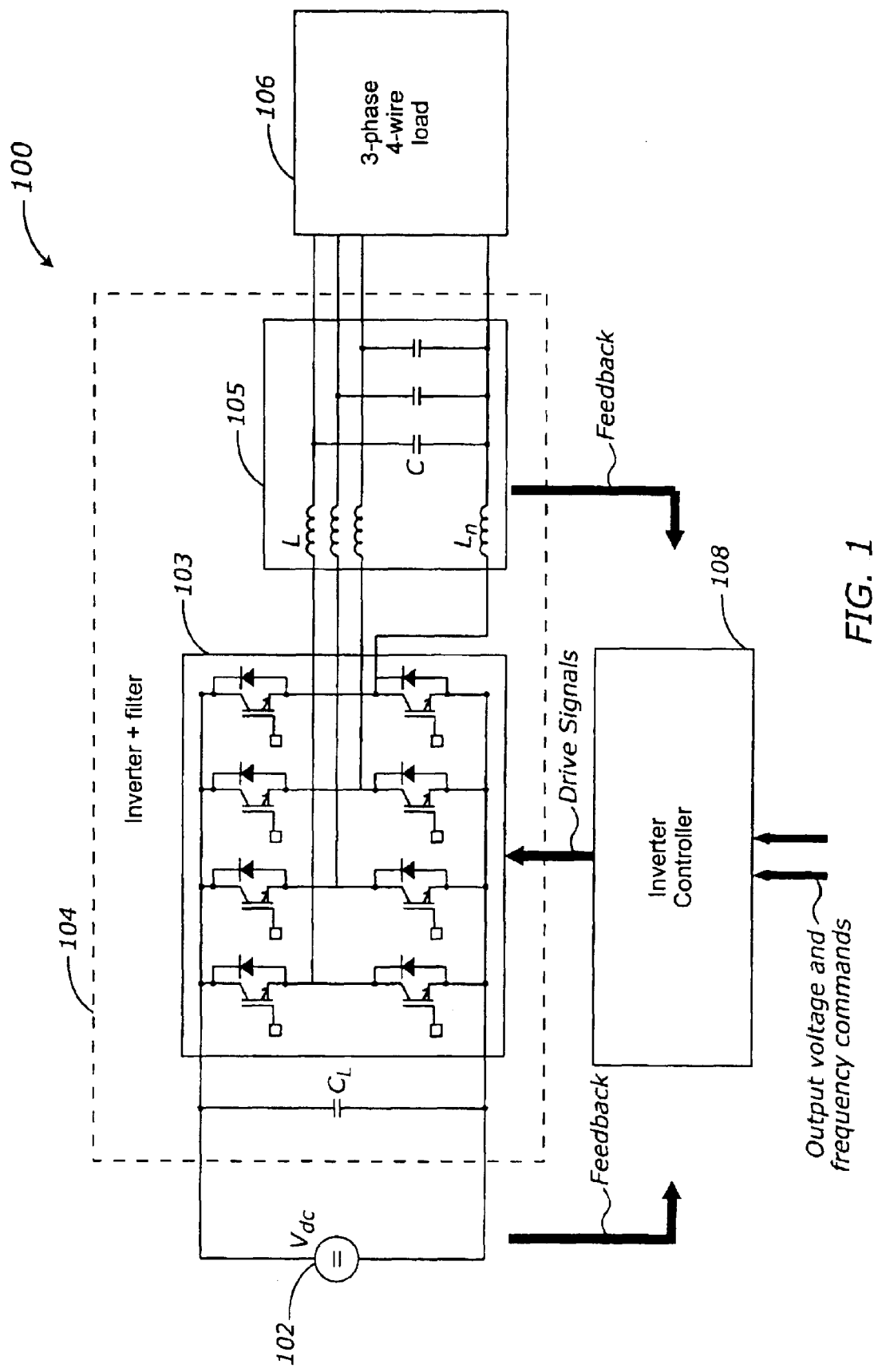
FIG. 1 is a block diagram of an exemplary four-leg three-phase inverter system.

According to an exemplary embodiment of a four-leg three-phase inverter system 100, shown in FIG. 1, a DC voltage source 102 supplies a selected level of voltage (Vdc) to an inverter/filter 104 connected to a three-phase four-wire load 106. Inverter/filter 104 typically comprises an input (link) capacitor $C_L$ connected across source 102, and in parallel with four sets of switching circuits 103, which generate a three-phase output signal via L-C filter 105 to the load 106. Inductor $L_n$ represents the inductance of the neutral line.

An inverter controller 108 is typically configured to receive voltage and frequency command signals from a control unit (not shown in FIG. 1), and to also receive feedback signals from the input Vdc and from the outputs of inverter/filter 104 at the inputs to load 106. Inverter controller 108 processes the command and feedback signals to create output drive signals for the inverter/filter 104 switching circuits 103. The inverter controller 108 output drive signals may include voltage and current regulating elements as well as load imbalance compensating elements.

Figure 2:
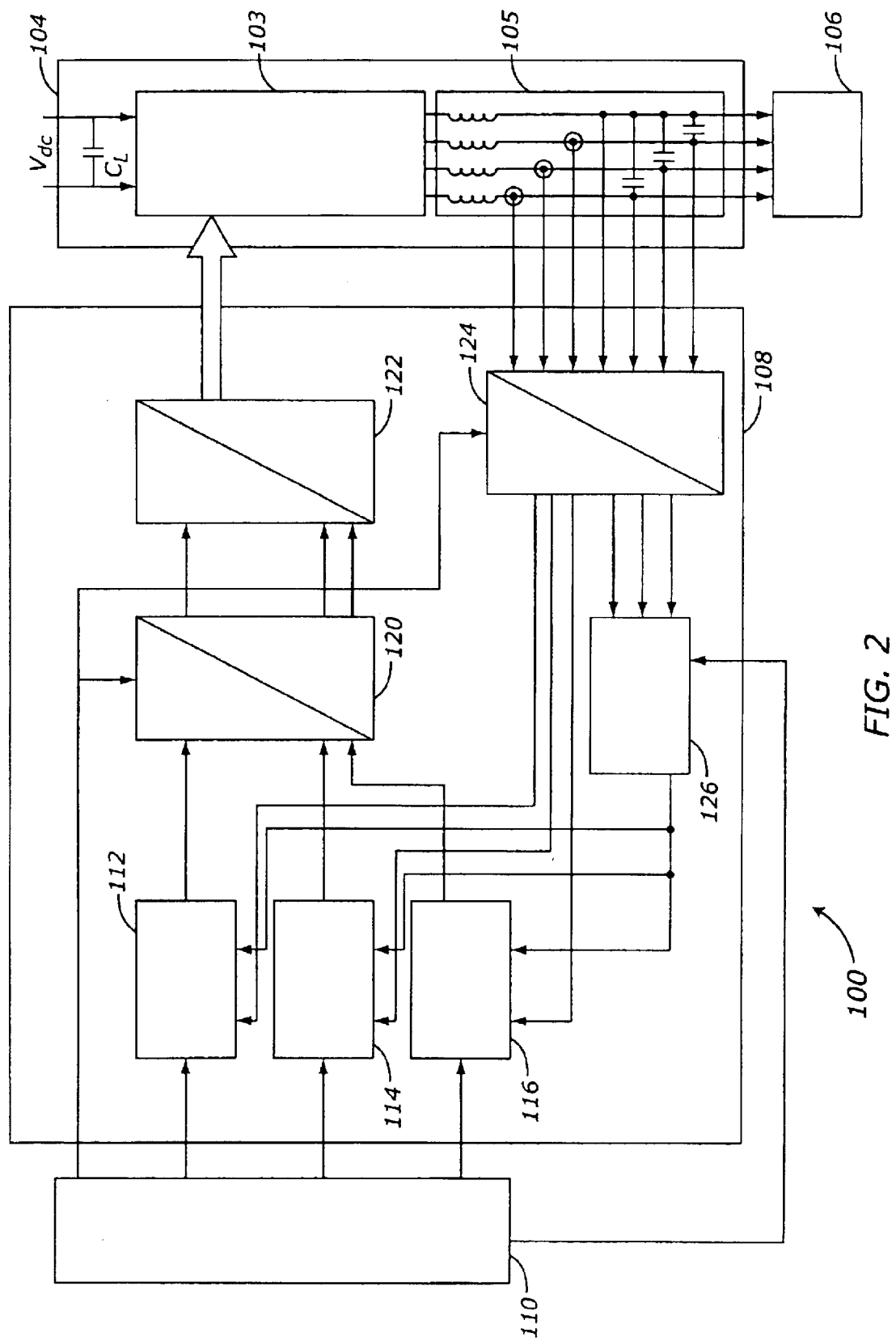
FIG. 2 is a simplified block diagram of an exemplary inverter controller.

FIG. 2 depicts a simplified block diagram of inverter controller 108 within the closed loop four-leg three-phase inverter system 100. In this embodiment, an external control unit 110 typically provides reference signals, such as voltage, current, frequency, etc., to inverter controller 108 to establish the desired output voltage and frequency values of inverter/filter 104. In an alternate embodiment, control unit 110 could be integrated within inverter controller 108.

Voltage regulator blocks 112, 114, 116 receive voltage reference signals from control unit 110 while a current limiting block 126 receives a current reference signal from control unit 110. Samples of the voltage and current outputs from L-C filter 105 are transformed from the AC domain to the DC domain in block 124, which receives a frequency reference signal from control unit 110. Voltage feedback signals from block 124 are fed to corresponding voltage regulator blocks 112, 114, 116, and current feedback signals from block 124 are fed to current limiting block 126. A current limiting signal from block 126 is applied to voltage regulator blocks 112, 114, 116.

Voltage regulating blocks 112, 114, 116 generate regulating signal outputs that are limited by the output of current limiting block 126. The regulating signal outputs are inverse transformed from the DC domain to the AC domain in block 120, which receives a frequency reference signal from control unit 110. The transformed regulating signals are then processed by block 122 into driving signals for the inverter 104 switching circuits 103. A more detailed description of the operation of inverter controller 108 is given below in conjunction with FIG. 3.

Figure 3:
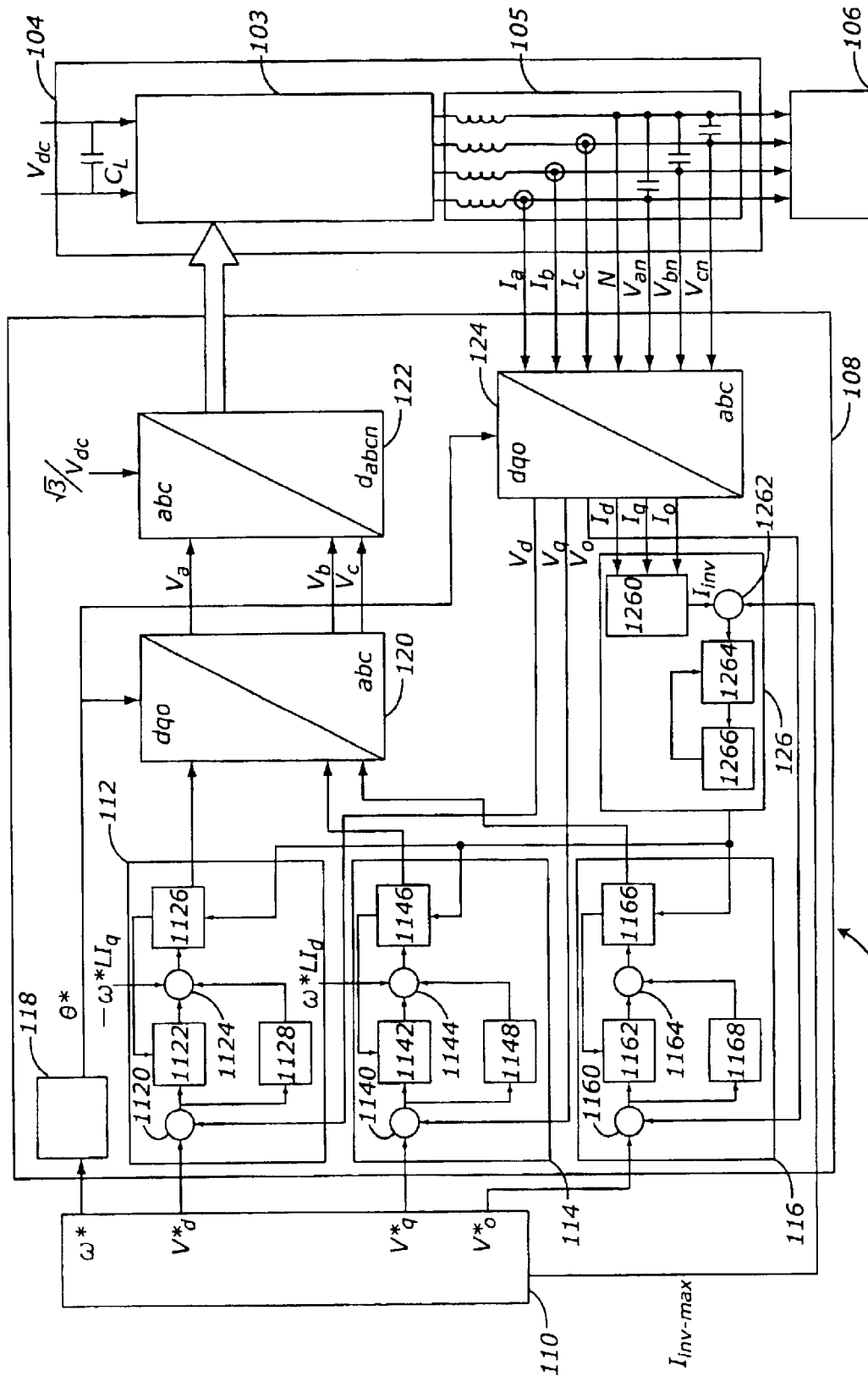
FIG. 3 is a detailed block diagram of an exemplary embodiment of an inverter controller.

An exemplary embodiment of an inverter controller 108 for a four-leg three-phase inverter/filter 104 is shown in a more detailed block diagram form in FIG. 3. In this embodiment, the block functions within inverter controller 108 are implemented in software modules to constitute a control algorithm for inverter/filter 104. This approach utilizes the Park transformation, as is known in the electrical machine art (see "Analysis of Electric Machinery" by Krause, Paul C., Wasynczuk, Oleg and Sudhoff, Scott D.; IEEE Press 1995, Institute of Electrical and Electronics Engineers, Inc.), to convert the sampled output signals from an AC domain to a DC domain in order to simplify the mathematical processes implemented within inverter controller 108. An inverse Park transformation is then used to convert the processed DC domain signals back to the AC domain for the control inputs to the inverter switching circuits 103. Other techniques for converting from the AC domain to the DC domain could be used in a wide array of equivalent embodiments.

The basic concept of the Park transformation is known as the synchronous reference frame approach. That is, a rotating reference frame is utilized in order to make the fundamental frequency quantities appear as DC values. A common convention is to label the AC domain (stationary reference frame) quantities, such as phase voltages and currents, as "abc", and to label the corresponding Park-transformed DC domain (synchronous reference frame) quantities as "dq0". This labeling convention will be followed throughout the following discussion.

Reference values for voltage, current and frequency are generally determined within a control unit 110 to establish desired values of inverter output voltage and frequency within a maximum current limit. The voltage references are shown in FIG. 3 as $V^*_d$, $V^*_q$, $V^*_0$, which are typically calculated Park transformations of predetermined reference three-phase voltage values. The maximum current limit value is shown in FIG. 3 as $I_{inv\_max}$, and the reference frequency is represented as $\omega^*$.

The inverter/filter 104 three-phase output voltages and currents may be measured by any conventional method to create feedback signals to inverter controller 108. The voltage feedback signals are typically measured between phase and neutral, and are designated herein as $V_{an}$, $V_{bn}$, $V_{cn}$. The current feedback signals can be measured by line sensors on each phase, and are designated herein as $I_a$, $I_b$, $I_c$.

Voltage feedback signals $V_{an}$, $V_{bn}$, $V_{cn}$ are converted from AC domain to DC domain equivalents via the Park transformation in block 124. The reference angle used for this transformation is designated $\theta^*$, and is generated by an integrator block 23 from the reference signal $\omega^*$. The transformed voltage feedback signals are designated $V_d$, $V_q$, $V_0$ and are fed back with changed sign to adders 1120, 1140 and 1160, respectively. The reference voltage signals $V^*_d$, $V^*_q$, $V^*_0$ are also inputted to adders 1120, 1140 and 1160, respectively, to generate voltage error signals ($V^*_d - V_d$, $V^*_q - V_q$, $V^*_0 - V_0$) at the outputs of the respective adders 1120, 1140, 1160.

The voltage error signals $V^*_d - V_d$, $V^*_q - V_q$, $V^*_0 - V_0$ are routed through proportional-integral (PI) controller blocks 1122, 1142, and 1162, respectively, for amplifying and smoothing. At the same time, voltage error signals $V^*_d - V_d$, $V^*_q - V_q$, $V^*_0 - V_0$ are also routed through band pass filter blocks 1128, 1148, and 1168, respectively.

Referring now to the d-axis voltage regulator (112) in this embodiment, block 1128 is configured as a second order band pass filter with an adjustable gain. The center frequency of filter 1128 is set at twice the reference frequency $\omega^*$, in order to provide a high gain for the d-axis voltage controller at this particular frequency. This is intended to compensate for an unbalanced inverter output voltage condition, where a voltage component at twice the fundamental frequency appears in the voltage feedback signal. By placing band pass filter 1128 in a parallel path within the d-axis voltage controller 112, the loop gain can be increased at $2^*\omega^*$ without affecting the phase and gain margin of the system.

The output signals from blocks 1122 and 1128 are combined in adder 1124, along with a quantity $-\omega^*LI_q$. This latter quantity is a feed-forward term, which may be obtained from control unit 110 by transforming the steady-state equations of the filter 105 from the stationary reference frame to the synchronous reference frame. The feed-forward term $-\omega^*LI_q$ is used in this embodiment to improve the transient response of the d-axis voltage regulator 112, and to reduce the cross-channel coupling between the d-axis and q-axis controllers (112 and 114). For the q-axis controller 114, the corresponding feed-forward term is $\omega^*LI_d$.

The q-axis voltage regulator 114 operates in essentially the same manner as the d-axis voltage regulator 112, except for the feed-forward term, as noted above.

The 0-axis voltage regulator 116 differs from the d-axis and q-axis regulators (112, 114) in that its associated band pass filter 1168 is tuned to $\omega^*$, rather than $2^*\omega^*$. This is due to the fact that an unbalanced output voltage condition will generally produce a fundamental frequency component on the 0-axis feedback signal. Also, there is generally no need for a feed-forward signal in the 0-axis channel.

The outputs of adders 1124, 1144 and 1164 are routed through limiter blocks 1126, 1146, and 1166, respectively.

Limiter blocks 1126, 1146, 1166 also receive a common input signal from current limiter 126, as will be described below. The limited output signals of blocks 1126, 1146, 1166 are then processed in block 120 from DC domain (dq0) to equivalent AC domain (abc) by means of an inverse Park transformation, using the reference angle $\theta^*$.

The regulating output signals from block 120 are designated $V_a$, $V_b$, $V_c$, and are normalized in block 122 by a multiplication factor ($\sqrt{3}/V_{dc}$), which is the inverse of the maximum achievable inverter phase output voltage for a given DC input voltage ($V_{dc}$). The normalized regulating voltages may be used to control the pulse train duty cycles of a conventional Pulse Width Modulator (PWM) within block 122, or through any other technique. The duty cycle modulated pulse trains, designated as $d_{abcn}$, are configured as the drive signals for the switching circuits 103 in inverter/filter 104. The switching devices in switching circuits 103, as depicted in FIG. 1, may be MOSFET's, IGBT's (Insulated Gate Bipolar Transistor), or any type of switching device with appropriate speed and power capabilities.

Referring now to the operation of current limiting block 126, current feedback signals $I_a$, $I_b$, $I_c$ are converted from AC domain to DC domain equivalents via the Park transformation in block 124. The transformed current feedback signals are designated $I_d$, $I_q$, $I_0$ and are fed into a summing block 1260 within current limiting block 126. The amplitude of inverter/filter 104 output current $I_{inv}$ is calculated in summing block 1260, based on the square root of the sum of the squares of the current feedback signals $I_d$, $I_q$, $I_0$. This calculated value ($I_{inv}$) is combined with the maximum current limit value $I_{inv\_max}$ in adder 1262 to form a difference signal ($I_{inv\_max} - I_{inv}$). This difference signal is then amplified and smoothed in a PI block 1264, so that the dynamics of the regulator are adequate for a fast reacting over-current protection. Block 1266 processes the output of block 1264 into a limiting factor, such as in the range of 0 to 1, where 1 corresponds to the maximum current limit. This limiting factor is then applied to the three limiting blocks 1126, 1146, 1166 as a multiplier, to add over-current protection to the voltage limiting function of blocks 1126, 1146, 1166.

It should be noted that the PI controllers (1122, 1142, 1162, 1264) in FIG. 3 each receive a feedback signal from their respective limiting modules (1126, 1146, 1166, 1266). This feedback scheme, known in the art as "integrator anti-wind-up", improves the transient behavior of the PI controllers.

The previously described drive signals from controller 108 to the switching circuits 103 provide the desired regulating control for the multi-phase output of inverter/filter 104. As such, controller 108 and inverter/filter 104 constitute a closed-loop feedback system for maintaining the stability and quality of the inverter/filter output.

In summary, the architecture of the inverter control algorithm, as disclosed in the exemplary embodiment of FIG. 3, provides a combination of voltage regulation, imbalance compensation, and over-current protection, with fast transient response, short execution time, and high harmonic suppression. Verification tests have demonstrated a voltage loop bandwidth capability of approximately 600 Hz for a sampling frequency of 12 kHz. Tests have also shown that voltage regulation (approximately 1%) and total harmonic distortion (approximately 2%) are essentially the same for a 100% unbalanced load operation as they are for a 100% balanced load operation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling an inverter having a plurality of control inputs and an alternating current multi-phase output, comprising the steps of:
   converting the alternating current multi-phase output to a direct current equivalent, wherein the direct current equivalent comprises a plurality of voltage elements and associated current elements, each voltage element and its associated current element corresponding to one phase of the multi-phase output;
   comparing each of the plurality of voltage elements to one of a plurality of reference voltages to create a plurality of difference voltage signals;
   creating voltage regulating signals from the difference voltage signals, wherein each of the voltage regulating signals comprises a fundamental compensating component combined with an imbalance compensating component;
   limiting the voltage regulating signals with a current limiting factor derived from the current elements;
   converting the voltage regulating signals to alternating current equivalents; and
   producing the plurality of control inputs to the inverter from the alternating current equivalents to thereby enable compensating regulation of the fundamental and imbalance characteristics of the alternating current multi-phase output.

2. The method of claim 1 further comprising the steps of:
   calculating a composite current amplitude based on the amplitudes of the current elements;
   generating a current difference signal based on the difference between the composite current amplitude and a predetermined maximum current limit;
   processing the current difference signal to generate a current limiting factor; and
   applying the current limiting factor to each of the voltage regulating signals.

3. The method of claim 1 wherein the step of converting the alternating current multi-phase output is implemented by a Park transformation.

4. The method of claim 1 wherein the step of converting the voltage regulating signals is implemented by an inverse Park transformation.

5. The method of claim 1 wherein the imbalance compensating components of the voltage regulating signals are harmonically related to the fundamental frequency of the inverter.

6. A controller for producing a plurality of control inputs to an inverter having an alternating current multi-phase output, the controller comprising:
   a first converter configured to transform the alternating current multi-phase output to a direct current equivalent, wherein the direct current equivalent comprises a plurality of voltage elements and associated current elements, each voltage element and its associated current element corresponding to one phase of the multi-phase output;
   a plurality of regulators, each regulator corresponding to one of the plurality of voltage elements, wherein each regulator is configured to compare its respective voltage element to one of a plurality of reference voltages to create a difference voltage signal, and to process the difference voltage signal into a voltage regulating signal, wherein each of the voltage regulating signals comprises a fundamental compensating component combined with an imbalance compensating component;
   a plurality of limiters, each limiter corresponding to one of the plurality of voltage regulating signals and configured to limit its respective voltage regulating signal with a current limiting factor derived from the current elements;
   a second converter configured to inverse transform the voltage regulating signals into alternating current equivalents; and
   an inverter driver configured to process the alternating current equivalents to produce the plurality of control inputs to the inverter to thereby enable compensating regulation of the fundamental and imbalance characteristics of the alternating current multi-phase output.

7. The controller of claim 6 further comprising:
   a calculator configured to calculate a current amplitude based on the current elements;
   an adder configured to subtract the current amplitude from a predetermined maximum current limit to produce a current difference signal; and
   a processor configured to generate a current limiting factor based on the current difference signal, wherein the current limiting factor is applied to each of the voltage regulating signals.

8. The controller of claim 6 wherein the first converter performs a Park transformation.

9. The controller of claim 6 wherein the second converter performs an inverse Park transformation.

10. An inverter system having an alternating current multi-phase output and a controller configured to supply control inputs to the inverter, comprising:
    means for transforming the alternating current multi-phase output into an equivalent direct current domain of a plurality of voltage regulating signals and a current limiting factor, each voltage regulating signal corresponding to one phase of the multi-phase output and each comprising a compensating fundamental component and a compensating imbalance component,
    means for limiting each of the voltage regulating signals with the current limiting factor;
    means for inverse transforming the limited voltage regulating signals into an equivalent alternating current domain; and
    means for processing the inverse transformed limited voltage regulating signals into the control inputs for the inverter, wherein the control inputs enable the inverter to effect compensating regulation of the fundamental and imbalance characteristics of the alternating current multi-phase output.

11. The inverter system of claim 10 wherein the inverter is a 4-leg three-phase inverter.

12. A method of controlling an inverter connected to a load, comprising the steps of:

converting the inverter output from AC domain elements to corresponding DC domain elements;

processing the DC domain elements into combined regulating and imbalance compensating elements;

restoring the combined regulating and imbalance compensating elements to corresponding AC domain elements; and providing the AC domain combined regulating and imbalance compensating elements to the inverter to stabilize the inverter output to the load.

13. A method of operating an inverter system having an alternating current multi-phase output and a controller configured to supply control inputs to the inverter, the method comprising the steps of:

transforming the alternating current multi-phase output into an equivalent direct current domain of a plurality of voltage regulating signals and a current limiting factor, each voltage regulating signal corresponding to one phase of the multi-phase output and each comprising a compensating fundamental component and a compensating imbalance component, limiting each of the voltage regulating signals with the current limiting factor;

inverse transforming the limited voltage regulating signals into an equivalent alternating current domain; and processing the inverse transformed limited voltage regulating signals into the control inputs for the inverter, wherein the control inputs enable the inverter to effect compensating regulation of the fundamental and imbalance characteristics of the alternating current multi-phase output.

* * * * *